United States Patent
Razzell

(10) Patent No.: US 7,809,067 B2
(45) Date of Patent: Oct. 5, 2010

(54) MULTI-CARRIER OFDM UWB COMMUNICATIONS SYSTEMS

(75) Inventor: Charles Razzell, Pleasanton, CA (US)

(73) Assignee: NXP B.V., Eindhoven (NL)

( * ) Notice: Subject to any disclaimer, the term of this patent is extended or adjusted under 35 U.S.C. 154(b) by 1266 days.

(21) Appl. No.: 10/853,436

(22) Filed: May 24, 2004

(65) Prior Publication Data

US 2005/0259758 A1  Nov. 24, 2005

Related U.S. Application Data

(60) Provisional application No. 60/507,753, filed on Oct. 1, 2003.

(51) Int. Cl.
*H04K 1/10* (2006.01)
(52) U.S. Cl. .................... 375/260; 375/347; 370/436; 370/466; 370/468
(58) Field of Classification Search ............. 375/260, 375/267, 347; 370/210, 436, 466, 468, 515
See application file for complete search history.

(56) References Cited

U.S. PATENT DOCUMENTS

| 2004/0151109 A1* | 8/2004 | Batra et al. ................. 370/208 |
| 2004/0228269 A1* | 11/2004 | Balakrishnan et al. ...... 370/208 |
| 2005/0163235 A1* | 7/2005 | Mo et al. ..................... 375/260 |

FOREIGN PATENT DOCUMENTS

EP  1 045 531  10/2000

OTHER PUBLICATIONS

Anuj Batra et al. "Multi-band OFDM Physical Layer Proposal for IEE 802.15 Task Group 3a" Project: IEEE P802.15 Working Group for Wireless Personal Area Networks (WPANs), Nov. 2003, p. 6,7, 31-38.*
Vanderdorpe I: "Multitone spread sectrum multiple access communications system in a multipath rician fading channel" IEEE Transactions on Vehicular Technology, IEEE Inc. New York, US, May 1995, vol. 44, No. 2, pp. 327-337.*
Anuj Batra et al. "multi-band OFDM physical layer proposal for IEEE 802.15 task group 3a" project; IEEE p802.15 working group for wireless personal area networkds (WPANs), Nov. 2003, pp. 1-38.*
Vandendorpe L: "Multitone Spread Spectrum Multiple Access Communications System in a Multipath Rician Fading Channel" IEEE Transactions on Vehicular Technollogy, IEEE Inc. New York, NY, vol. 44., No. 2, May 1995.

* cited by examiner

*Primary Examiner*—David C Payne
*Assistant Examiner*—Rahel Guarino

(57) ABSTRACT

The present invention, generally speaking, provides for signaling methods in which multiple sub-hands of a transmission band are continuously occupied by an OFDM signal that would otherwise occupy only a single sub-hand. In accordance with one embodiment, steps include producing an OFDM symbol; transforming the OFDM symbol to produce an OFDM signal; upsampling the OFDM signal to produce an upsampled OFDM signal; applying a pseudo-random code to the upsampled OFDM signal to produce a coded OFDM signal; and upconverting the coded OFDM signal to produce a radio frequency signal. In accordance with another embodiment, steps include producing a sequence of N consecutive identical OFDM symbols; transforming the OFDM symbols to produce corresponding OFDM signals; and upconverting the coded OFDM signal to produce a radio frequency signal; wherein the radio frequency signal occupies N sub-hands of a transmission band.

12 Claims, 14 Drawing Sheets

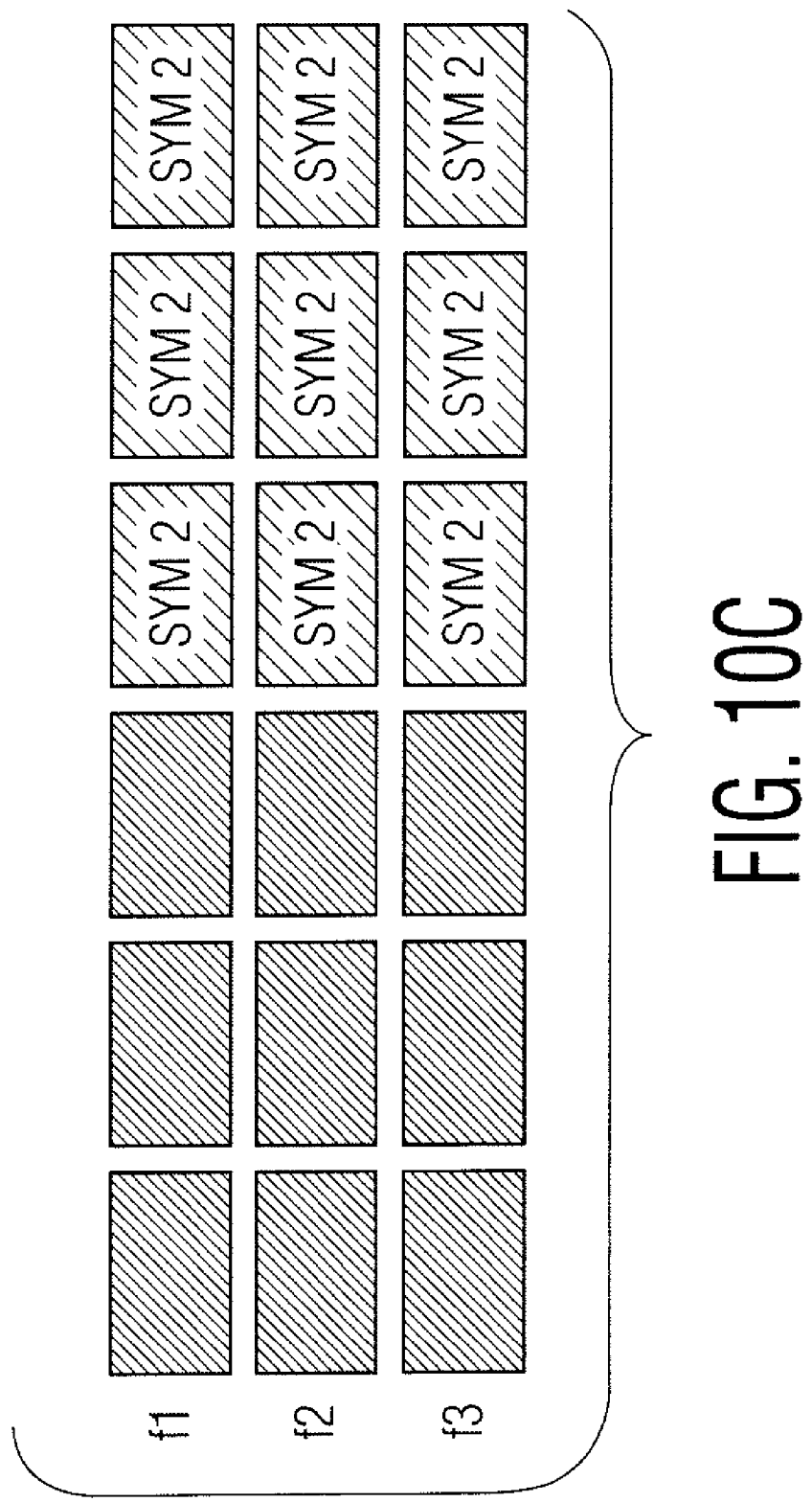

| DATA RATE (Mb/s) | MODULATION | CODING RATE (R) | CONJUGATE SYMMETRIC INPUT TO IFFT | TIME SPREADING FACTOR (TSF) | FREQ. SPREADING FACTOR | CODED BITS PER OFDM SYMBOL ($N_{CBPS}$) |
|---|---|---|---|---|---|---|
| 53.3 | QPSK | 1/3 | YES | 2 | 2 | 100 |
| 53.3 | QPSK | 1/2 | YES | 3 | 3 | 100 |
| 55 | QPSK | 11/32 | YES | 2 | 2 | 100 |
| 80 | QPSK | 1/2 | YES | 2 | 2 | 100 |
| 106.7 | QPSK | 1/3 | NO | 2 | 2 | 200 |
| 106.7 | QPSK | 1/2 | NO | 3 | 3 | 200 |
| 110 | QPSK | 11/32 | NO | 2 | 2 | 200 |
| 160 | QPSK | 1/2 | NO | 2 | 2 | 200 |
| 200 | QPSK | 5/8 | NO | 2 | 2 | 200 |

FIG. 11

MULTI-CARRIER OFDM UWB COMMUNICATIONS SYSTEMS

BACKGROUND OF THE INVENTION

1. Field of the Invention

The present invention relates to wideband RF communications systems, and more particularly to ultra-wideband (UWB) communications systems.

2. State of the Art

Ultra-Wideband Signals have been legal in the United States since February 2002 under conditions stipulated by the FCC Report and Order 02-48. Briefly, UWB signals must never be transmitted with a power spectral density of more than −41.2 dBm/MHz in a band from 3.1 GHz to 10.7 GHz. Elsewhere, the power must be reduced even further to protect existing services. Since the power limit is specified as a power spectral density, the transmit power is proportional to the bandwidth, and hence the desire is to occupy as much bandwidth as possible within economic and feasibility constraints and thereby maximize the possible link range. However, due to the increasing RF path loss with carrier frequency, as well as increasing noise figure of semiconductor devices, initial interest is concentrated on exploiting the spectrum from 3.1-4.9 GHz.

Two competing standards proposals for UWB have emerged, one identified with Motorola and the other identified with a coalition of companies referred to as the Multiband OFDM Alliance (MBOA). The MBOA-OFDM (hereinafter "MB-OFDM") system borrows heavily from the existing wireless LAN concepts for 802.11a and 802.11g. The OFDM signal consists of 128 sub-carriers. These carriers occupy a 528 MHz, so the sub-carrier spacing is 4.125 MHz. Since the carrier spacing is 4.125 MHz, it follows that the OFDM symbol length must be 1/4.125e6=242.42 ns. To allow for inter-symbol interference a zero-energy prefix of ¼ of the symbol length (60.6 ns) is applied in place of the more traditional cyclic prefix. Finally a guard period of 5 samples (9.47 ns) is added. The total OFDM symbol length is 312.5 ns.

Of the 128 sub-carriers, 5 are set to nulls at the band edges, so that the actual occupied bandwidth is only 507.375 MHz (marginally wider than the mandated 500 MHz). Moreover, only 100 of the 128 sub-carriers are information-bearing; the others are either pilots, user-defined, or nulls. The 100 information-bearing tones carry QPSK modulation, thus providing 2 bits each, or 200 bits per OFDM symbol. The total gross information rate is thus (200/312.5e-9), or 640 Mbps. After channel coding redundancy is taken into account, the maximum protected data rate is 480 Mbps (¾ rate code).

As noted above the plain use of OFDM results in an occupied spectrum of just over 500 MHz, which is less than a third of the UWB spectrum available below 5 GHz. Since the transmitted power is proportional to the occupied bandwidth, failure to address this would have a serious impact on the available range. The MB-OFDM specification uses a 3-band hopping scheme to realize a 3-fold increase in bandwidth. The method adopted is that successive OFDM symbols are transmitted in different bands according to a predefined hopping sequence of length 6. These hopping sequences are designed to minimize collisions between uncoordinated piconets and are called Time-Frequency Interleaving (TFI) Codes. Example sequences include {1, 2, 3, 1, 2, 3}, {3, 2, 1, 3, 2, 1}, {1, 1, 2, 2, 3, 3} etc., where each index represents a specific 528 MHz frequency band.

The following table shows how PHY-SAP data rates from 53.3 to 480 Mbps are derived from the basic 640 Mbps uncoded bit rate.

| Data Rate (Mb/s) | Modulation | Coding rate (R) | Conjugate Symmetric Input to IFFT | Time Spreading Factor (TSF) | Overall Spreading Gain | Coded bits per OFDM symbol ($N_{CBPS}$) |
|---|---|---|---|---|---|---|
| 53.3 | QPSK | ⅓ | Yes | 2 | 4 | 100 |
| 55 | QPSK | 11/32 | Yes | 2 | 4 | 100 |
| 80 | QPSK | ½ | Yes | 2 | 4 | 100 |
| 106.7 | QPSK | ⅓ | No | 2 | 2 | 200 |
| 110 | QPSK | 11/32 | No | 2 | 2 | 200 |
| 160 | QPSK | ½ | No | 2 | 2 | 200 |
| 200 | QPSK | ⅝ | No | 2 | 2 | 200 |
| 320 | QPSK | ½ | No | 1 (No spreading) | 1 | 200 |
| 400 | QPSK | ⅝ | No | 1 (No spreading) | 1 | 200 |
| 480 | QPSK | ¾ | No | 1 (No spreading) | 1 | 200 |

The three mechanisms for introducing redundancy are as follows:

1. Convolutional Coding with rates ⅓, 11/32, ½, ⅝ and ¾.
2. Conjugate Symmetric Input to the IFFT, which introduces a factor of ½.
3. Time spreading, where complete OFDM symbols may be repeated on different frequencies.

All three of these techniques are briefly described in the following paragraphs.

Convolutional Coding

A 64-state convolutional encoder is used with 3 polynomials to create a ⅓-rate mother code. Puncturing of the output is used to adapt the code rate by reducing the redundancy. Different puncturing patterns are employed to obtained the specified rates according to the MB-OFDM specification. At the receiver, depuncturing is performed by inserting zeros in place of the punctured out bits, before processing by the Viterbi decoder.

Conjugate Symmetric Input to the IFFT

The sum of two complex exponential equal and opposite angular frequencies and complex conjugate coefficients can be shown as follows.

$$1/2[(a+bj)\exp(j\omega t) + (a-bj)\exp(-j\omega t)] =$$
$$1/2[(a+bj)(\cos(\omega t) + j\sin(\omega t)) + (a-bj)(\cos(\omega t) - j\sin(\omega t))] =$$
$$1/2[a\cos(\omega t) - b\sin(\omega t) + j(b\cos(\omega t) + a\sin(\omega t)) +$$
$$a\cos(\omega t) - b\sin(\omega t) - j(b\cos(\omega t) + a\sin(\omega t))] =$$
$$a\cos(\omega t) - b\sin(\omega t) = \sqrt{a^2+b^2}\cos(\omega t + \phi); \phi = \arctan(b, a)$$

The corresponding time sequence (the result of the IFFT) is thereby forced to be real, since it represents an integer number of cycles of a cosine wave of amplitude and phase defined by |a+bj| and angle(a+jb) respectively, as demonstrated by mathematical identities above.

The use of this principal in the MB-OFDM transmitter is as follows. There are allocated 100 complex QPSK symbols in the 128 pt IFFT. Initially, only 50 of these are filled with QPSK symbols corresponding to positive frequencies, the remaining 50 are copied to the negative frequency bins but with a complex conjugate operation. The FFT bins corresponding to d.c. and $\pm f_s/2$ are set to zero along with the four other null tones. Since the result of the IFFT is guaranteed to be entirely real, hardware simplifications can be realized in the transmitter (only the real arm of the quadrature upconversion need be realized, and certain arithmetic operations in the IFFT can be eliminated).

Time Spreading

For data rates of 53.3, 55, 80, 106.7, 110, 160 and 200 Mbps a time-domain spreading operation is performed with a spreading factor of two. The time-domain spreading operation consists of transmitting the same information over two OFDM symbols. These two OFDM symbols are transmitted over different sub-bands to obtain frequency diversity. For example, if the device uses a time-frequency code [1 2 3 1 2 3], the information in the first OFDM symbol is repeated on sub-bands 1 and 2, the information in the second OFDM symbol is repeated on sub-bands 3 and 1, and the information in the third OFDM symbol is repeated on sub-bands 2 and 3.

A block diagram of a known MB-OFDM UWB transmitter is shown in FIG. 1. Input data is first scrambled (block 101), then encoded (blocks 103, 105), then formed into data symbols and finally OFDM symbols (blocks 107, 109). The frequency-domain OFDM symbols are then transformed into a baseband time-domain signal (blocks 111, 113) and upconverted to an RF time-domain signal (blocks 115, 117) applied to an antenna 119. Note in block 111 (IFFT) the insertion of pilot tones and the addition of a cyclical prefix and a guard interval as explained previously. Further note in block 115 the application of a time-frequency code as explained previously.

A block diagram of a known MB-OFDM UWB receiver is shown in FIG. 2. The receiver is a quadrature receiver having an RF front end 230 including a I branch 210 and a Q branch 220. In block 240, an FFT is performed to transform the received time-domain signal back into a frequency-domain OFDM symbol; concurrently, synchronization is performed, and the cyclical prefix is removed. Block 251 is responsible for frequency domain equalization, which may be achieved, for example, by dividing each complex frequency-domain signal sample by its corresponding frequency-domain channel estimate. For best results the carrier phase estimate initially obtained from the pre-amble should be periodically updated by tracking algorithms (block 253) as the burst progresses. Blocks 207, 203 and 201 perform the inverse operations of blocks 107, 103 and 101.

In the foregoing MB-OFDM approach, although the average PDS of the signal over the course of a TFI code satisfies FCC requirements, as the time interval over which the average is calculated is shortened, an argument may be made that strict compliance with the requirements is not achieved. A need therefore exists for alternative approaches that achieve strict rules compliance while preserving the advantages of the MB-OFDM approach.

SUMMARY OF THE INVENTION

The present invention, generally speaking, provides for signaling methods in which multiple sub-bands of a transmission band are continuously occupied by an OFDM signal that would otherwise occupy only a single sub-band. In accordance with one embodiment, steps include producing an OFDM symbol; transforming the OFDM symbol to produce an OFDM signal; upsampling the OFDM signal to produce an upsampled OFDM signal; applying a pseudo-random code to the upsampled OFDM signal to produce a coded OFDM signal; and upconverting the coded OFDM signal to produce a radio frequency signal. In accordance with another embodiment, steps include producing an OFDM symbol; transforming the OFDM symbol to produce an OFDM signal; and upconverting the coded OFDM signal to produce a radio frequency signal; wherein the radio frequency signal occupies multiple ones of the following sub-bands: a first sub-band from about 3200 MHz to about 3700 MHz; a second sub-band from about 4000 MHz to about 4200 MHz; and a third sub-band from about 4200 MHz to about 4800 MHz. In accordance with still another embodiment, steps include producing a sequence of N consecutive identical OFDM symbols; transforming the OFDM symbols to produce corresponding OFDM signals; and upconverting the coded OFDM signal to produce a radio frequency signal; wherein the radio frequency signal occupies N sub-bands of a transmission band.

BRIEF DESCRIPTION OF THE DRAWING

The present invention may be more fully understood from the following description in conjunction with the appended drawing. In the drawing:

FIGS. 10a-10c are explanatory diagrams illustrating square time-frequency spreading of OFDM symbols;

FIG. 11 is a table setting forth examples of modified spreading schemes.

DETAILED DESCRIPTION OF THE PREFERRED EMBODIMENTS

Because of the FCC rule mandating very low PSD within the spectrum proposed for UWB transmissions, a strategy in order to maximize transmission range is to occupy as much bandwidth as possible in order to maximize total transmission power. A challenge of UWB systems is to occupy a very wide bandwidth without prohibitive hardware complexity. The present invention addresses this need.

Figure 3:
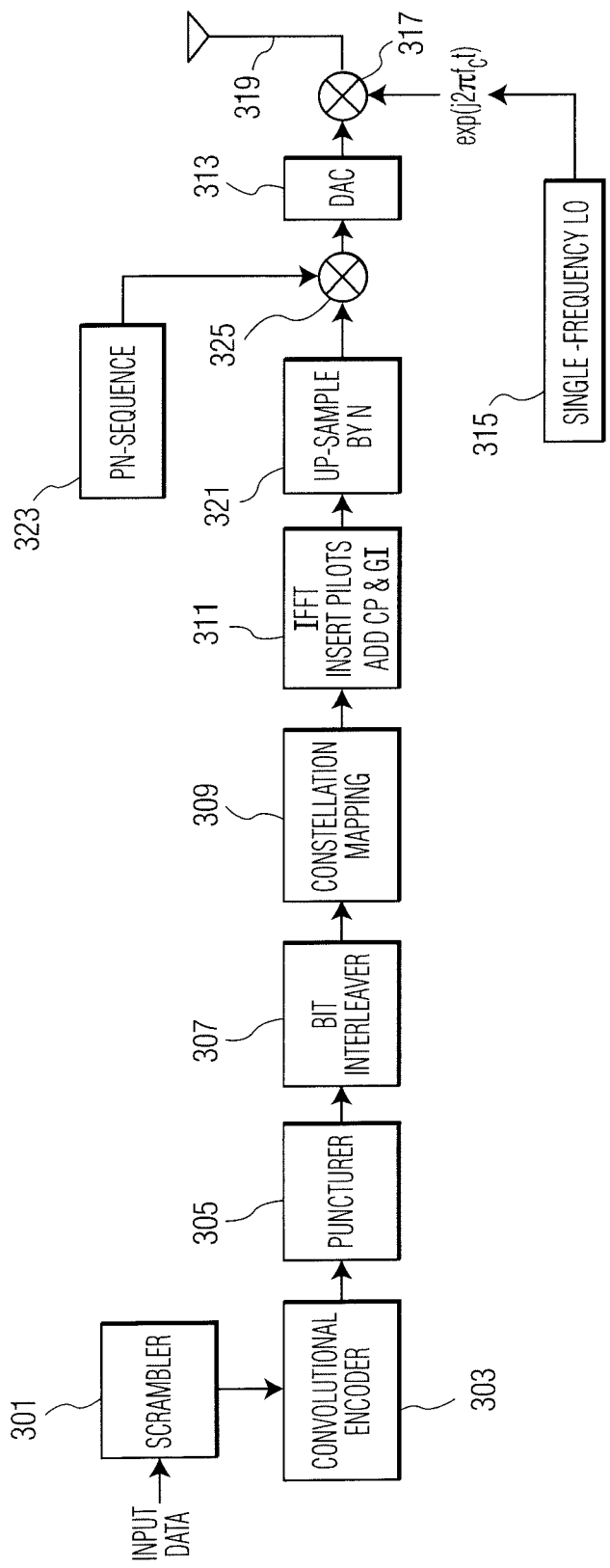
FIG. 3 is a block diagram of a modified direct-sequence OFDM transmitter in accordance with one embodiment of the present invention.

Referring now to FIG. 3, a block diagram is shown of a modified direct-sequence OFDM transmitter in accordance with one embodiment of the present invention. Blocks 301, 303, 305, 307, 309, 311 and 313 operate in substantially the same manner as corresponding blocks in FIG. 1. Unlike the transmitter of FIG. 1, however, in the transmitter of FIG. 3, the OFDM symbol is up-sampled by a factor of N in block 321. The resulting upsampled signal is then multiplied by a PN sequence by blocks 323 and 325. As a result, a baseband signal produced by block 313 occupies a wider bandwidth. This greater bandwidth occupancy allows the known TFI code of FIG. 1 to be eliminated. Instead, a single-frequency local oscillator 315 is used to up-convert the signal to RF. The resulting RE signal then occupies substantially all of the bandwidth from about 3200 MHz to about 4800 MHz.

In the transmitter of FIG. 3, each complex sample at the output of the IFFT is replaced with a code sequence of length N. The magnitude and phase of the transmitted code sequence is determined by the corresponding complex sample from the transmitter. For example, the length 3 hopping sequence of the known MB-OFDM UWB proposal may be replaced by a chip sequence of length 4 or more.

Figure 4:
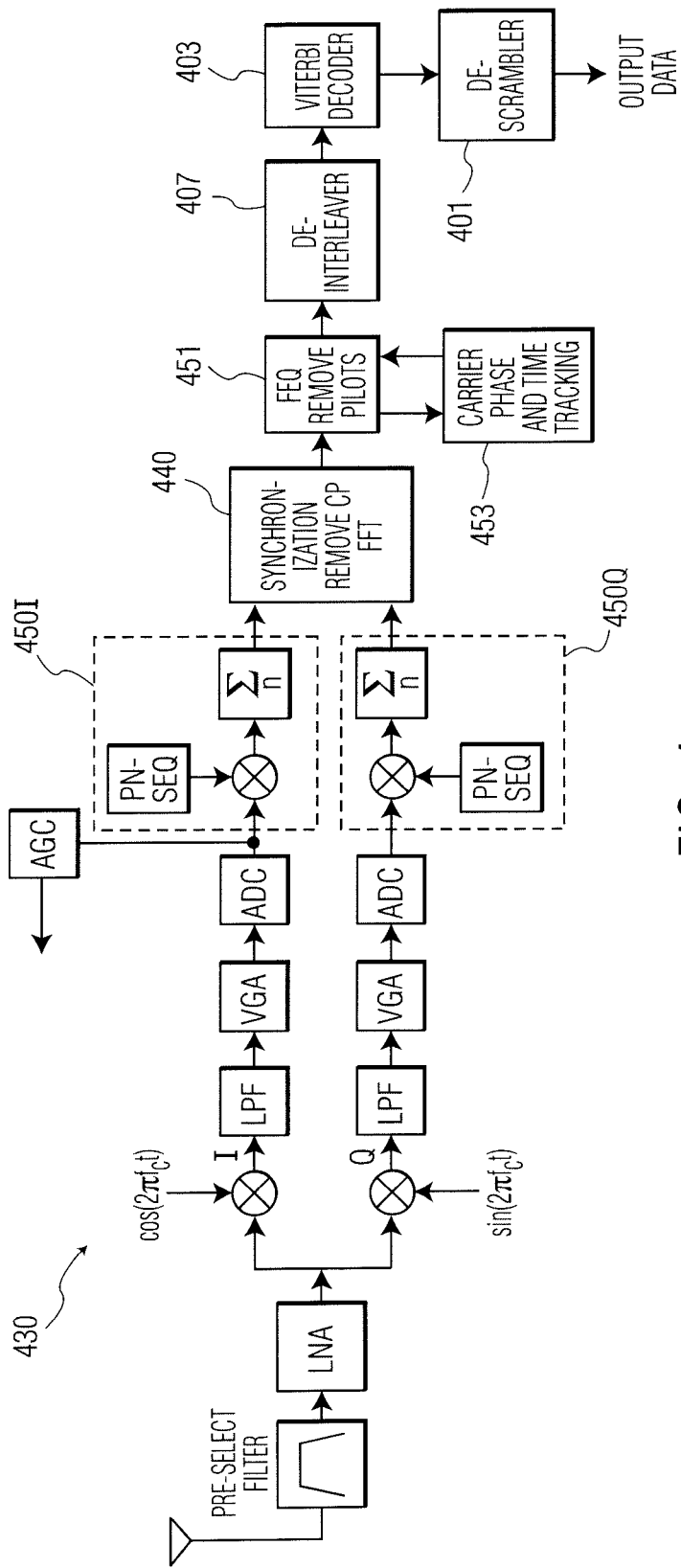
FIG. 4 is a block diagram of an exemplary receiver architecture using digital correlators according to one embodiment of the present invention.

A block diagram of a receiver for receiving the RF signal produced by the transmitter of FIG. 3 is shown in FIG. 4. The RF front end 430 of the receiver operates in substantially the same manner as the RF front end of FIG. 2. Also, blocks 440, 451, 453, and blocks 407, 403 and 401 operate in substantially in the same manner as corresponding blocks in FIG. 2. Unlike the receiver of FIG. 2, however, the receiver of FIG. 4 includes digital correlators 450I and 450Q in the I and Q paths, respectively. These correlators constructively combine n consecutive samples, correcting appropriately for the polarity of the individual PN chips before summing them. This results both in a bandwidth compression equal to the bandwidth expansion applied in the receiver and in an increased SNR by the factor n. The phase of the PN sequence used for correlation is set to a pre-arranged value at the end of the preamble, so that by counting from this known starting point both transmitter and receiver can be synchronized without the need for a search algorithm in the receiver.

Figure 5:
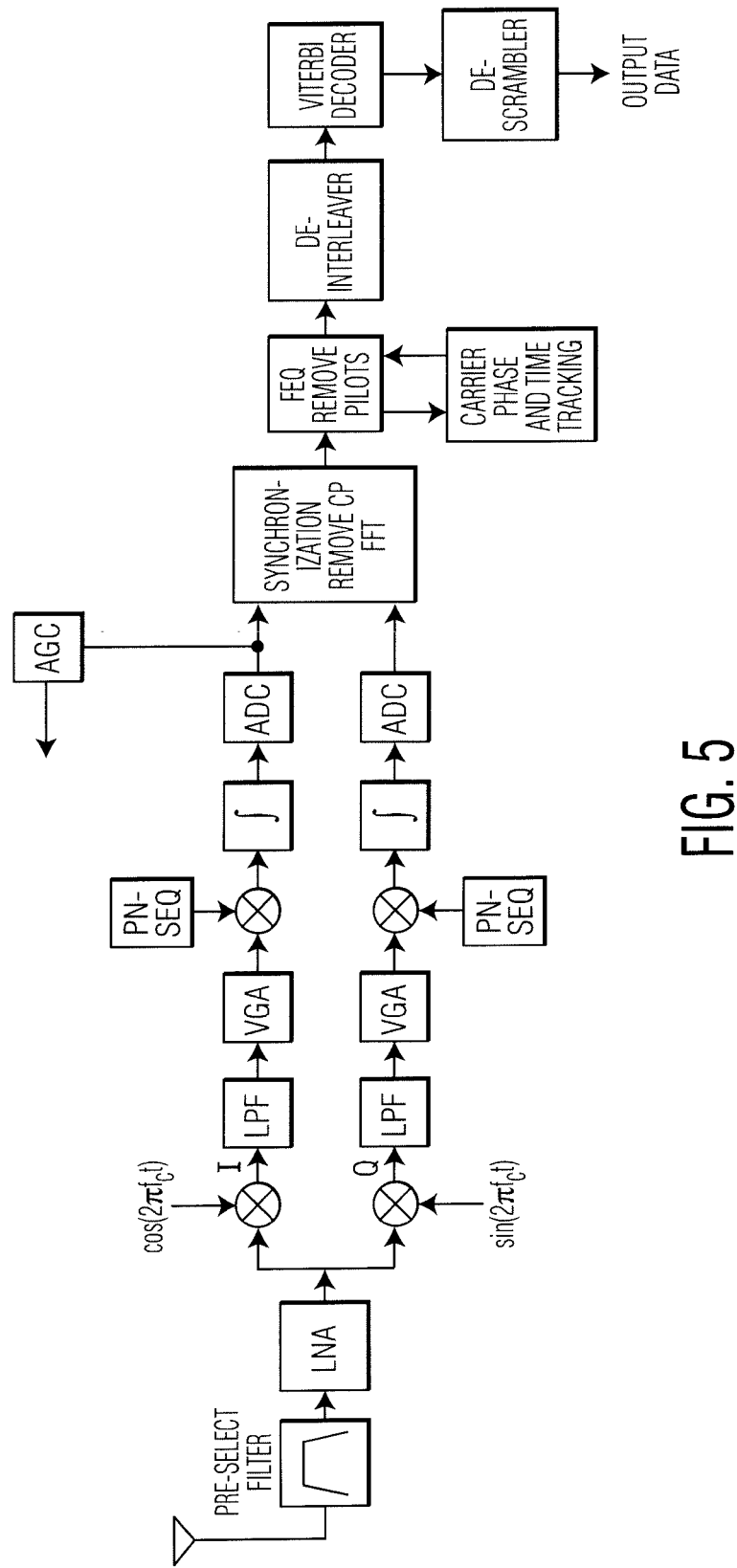
FIG. 5 is a block diagram of an exemplary receiver architecture using analog correlators according to one embodiment of the present invention.

A receiver using analog correlators is shown in FIG. 5.

In the system of FIGS. 4 and 5, a tradeoff may be made between the choice of spreading gain and the length of the OFDM symbol. If the output of the IFFT in the transmitter is sufficiently wideband to qualify as a UWB signal without further spreading (i.e., >500 MHz), then an FDMA fall-back mode is obtained simply by freezing the PN sequence in the transmitter. This type of operation is useful for multiple piconets in very close proximity. FDMA mode may also be used in cases where link distance is not an issue, such as in some cases of wireless USB. In other cases, it may be more advantageous to consider the use of longer OFDM symbols (occupying a lower bandwidth than 500 MHz), compensated by the use of longer spreading codes. This type of operation may be attractive especially in the case of low data rate modes. For example, instead of an OFDM symbol length of 312.5 ns and a spreading factor of 4, an OFDM symbol length of 625 ns and a spreading factor of 8 might be used.

Figure 1:
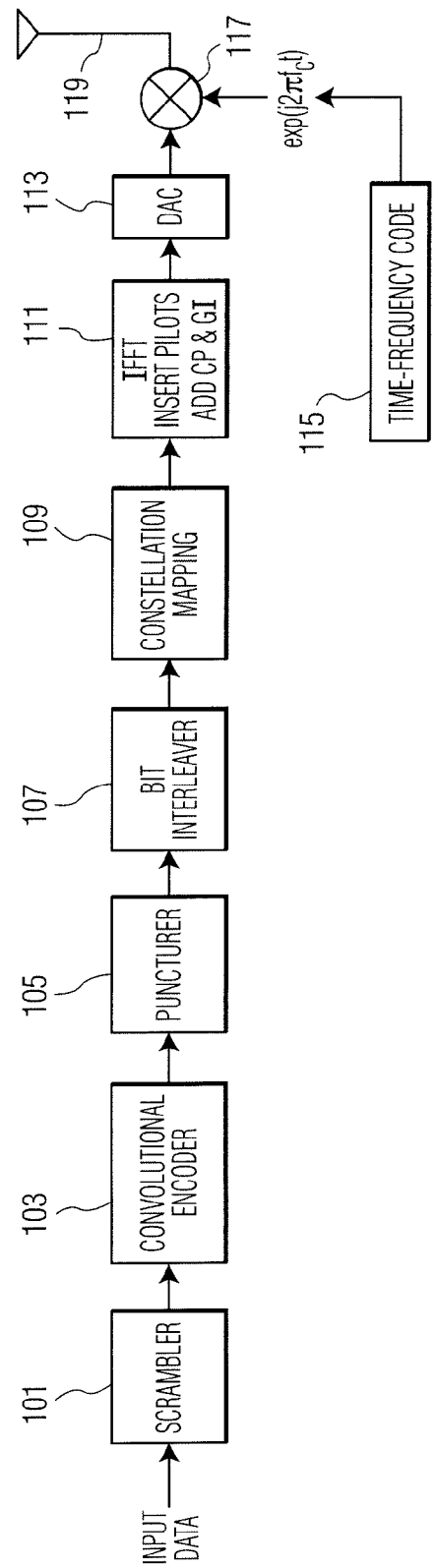
FIG. 1 is a block diagram of a known MB-OFDM transmitter.
Figure 2:
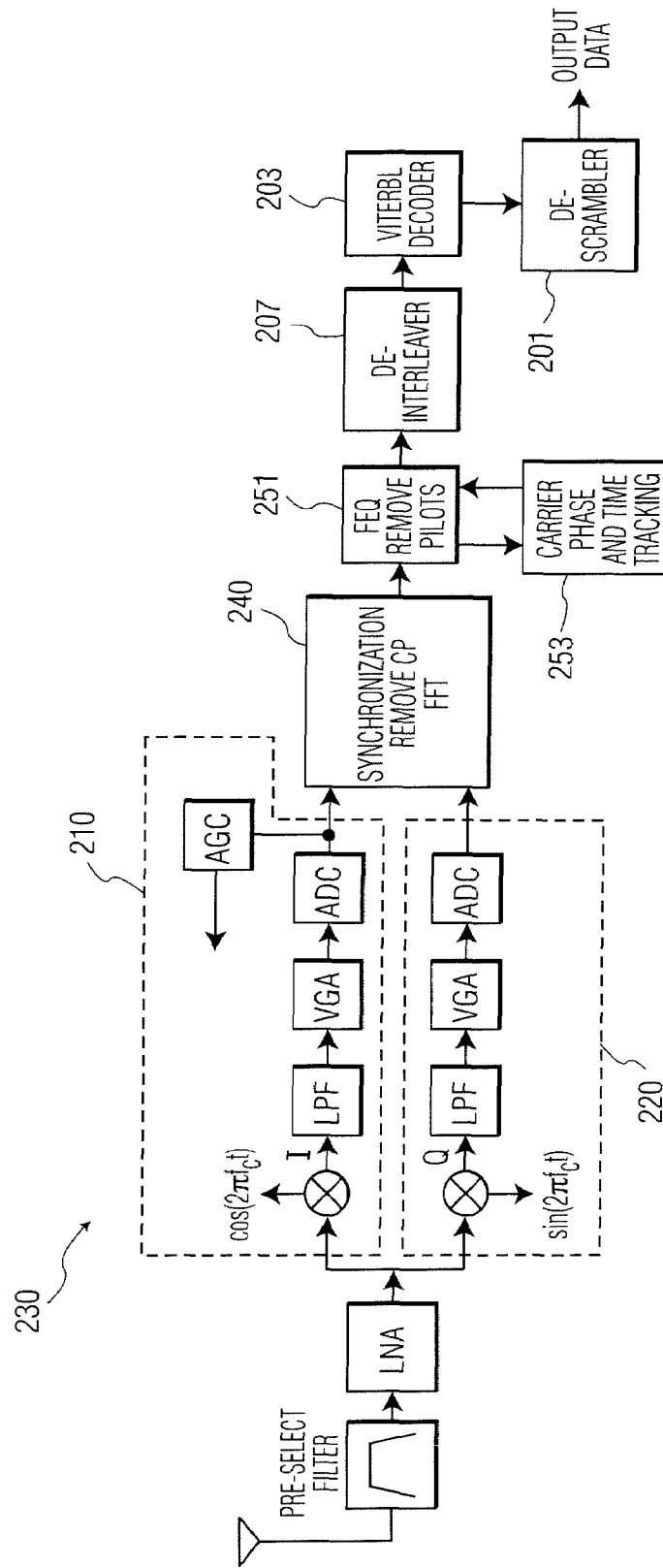
FIG. 2 is a block diagram of a known MB-OFDM receiver.

An advantage of the system of FIGS. 4 and 5 is that the FFT complexity can remain unchanged as compared to the system of FIGS. 1 and 2, for example. The process of spreading in the transmitter and despreading in the receiver should leave the samples unaltered in the ideal system. The principle disadvantage of this approach is that in multipath channels, multiple correlators may be needed to collect and combine sufficient energy to obtain the desired performance. Indeed, any delay spread beyond the length of one "chip" period will be scrambled by the PN sequence and appear as noise to the subsequent OFDM processing. Therefore in practical systems a set of correlators must be used with complex tap weights applied to their outputs defined by the complex conjugate of the estimated channel tap weights. The same procedure is used in conventional CDMA receivers including those proposed for UWB and is widely known as a RAKE receiver.

Figure 6:
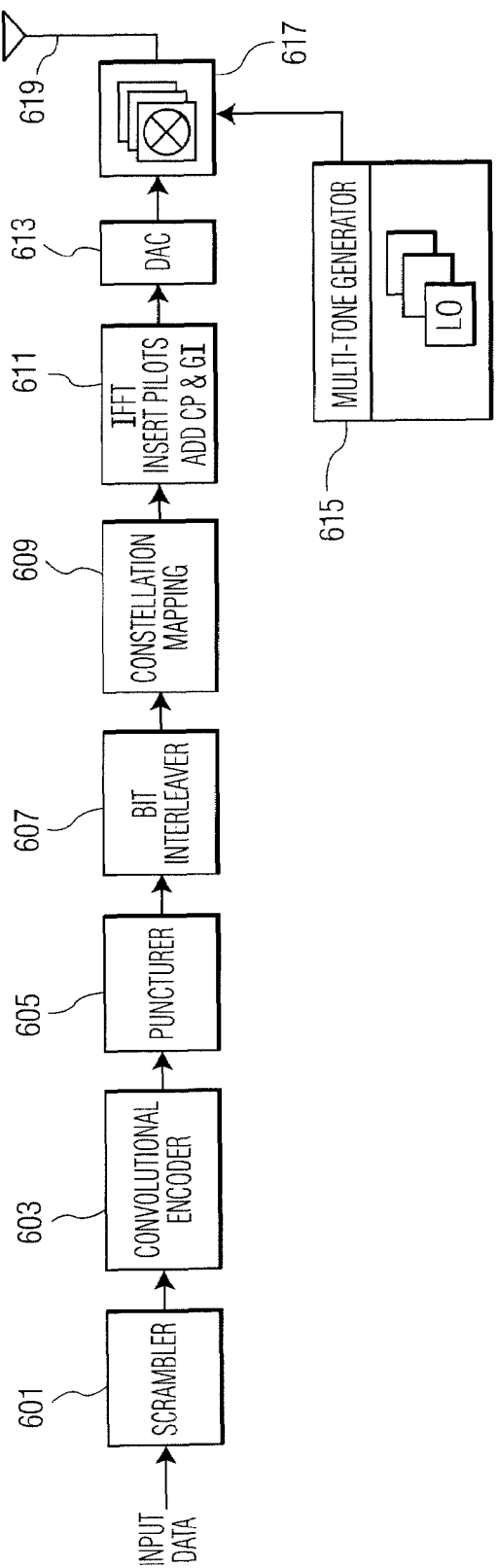
FIG. 6 is a block diagram of a modified MB-OFDM transmitter in accordance with another embodiment of the present invention.

Instead of taking measures during baseband processing to occupy a wide bandwidth, measures may be taken during upconversion. One approach is to take advantage of the aliasing behavior of DACs. Referring to FIG. 1, block 113 typically includes or is followed by an anti-aliasing filter. Where it is desired to occupy a specified bandwidth, the anti-aliasing filter may be modified to pass alias components within that bandwidth. A more direct approach is to mix the baseband signal with a comb of continuously present carriers. A block diagram of such a transmitter is illustrated in FIG. 6. As compared to the transmitter of FIG. 1, in which block 115 produces a TFI code, in FIG. 6, a multi-tone generator 615 is used. As a result, the identical OFDM symbol is copied to each sub-band having its frequency generated by the multi-tone generator.

Figure 7:
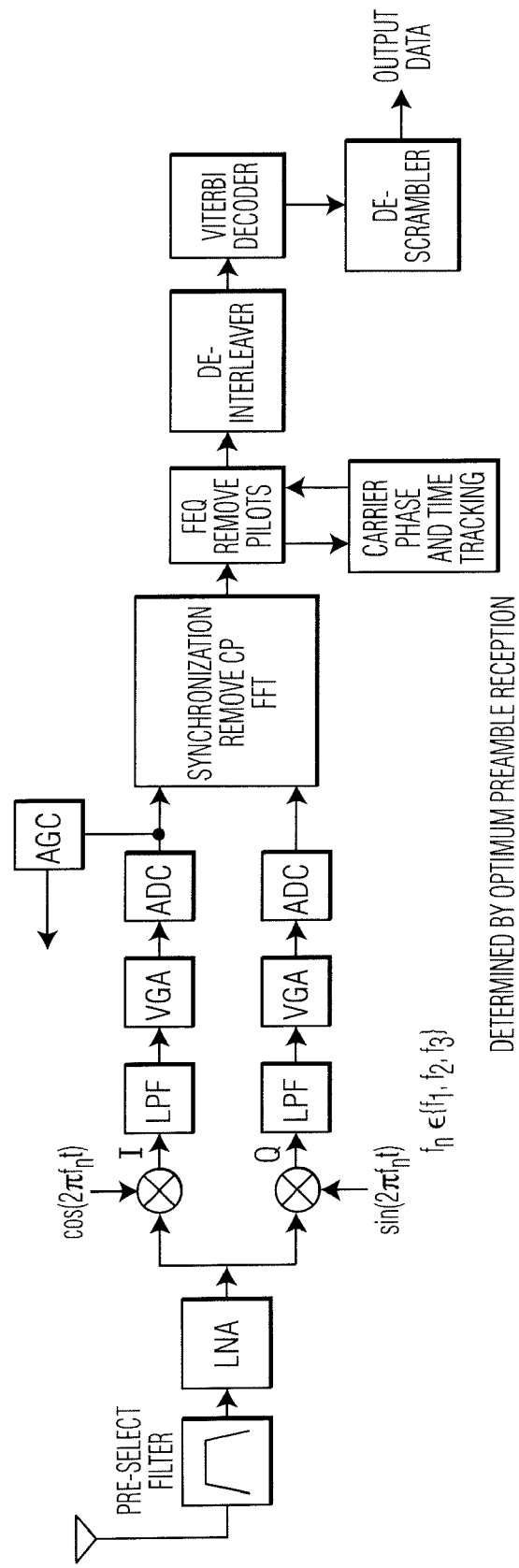
FIG. 7 is a block diagram of an exemplary receiver architecture according to another embodiment of the present invention.

A variety of receiver options may be used to receive the signal produced by the transmitter of FIG. 6, allowing for solutions of different complexity and cost. Referring to FIG. 7, one option is to receive only one sub-band, for example selecting a sub-band that gives the best preamble reception. The approach may be described as selection diversity. As compared to the receiver of FIG. 2, in the receiver of FIG. 7, no predefined frequency hopping occurs. The complexity of the FFT remains the same. Furthermore, narrow-band interference in one of the sub-bands can be avoided in this manner.

Figure 8:
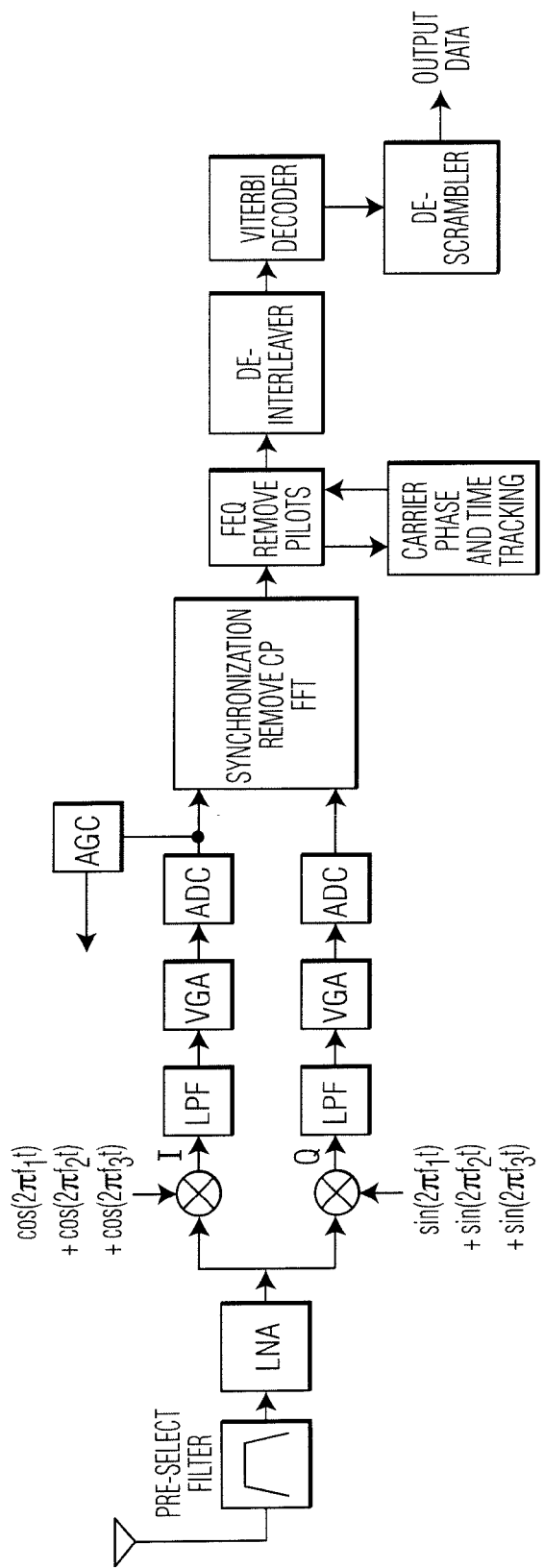
FIG. 8 is a block diagram of an exemplary receiver architecture according to a further embodiment of the present invention.

Referring to FIG. 8, another option is to combine together (non-coherently) the duplicate OFDM symbols from different sub-bands within the analog front end, effectively folding the different sub-bands into a single sub-band. This can be done by allowing different images to fold on top of each other, or by providing an explicit mixer and LO for each required down-conversion, or a combination of the two. In this approach, all of the transmit energy is recovered but the S/N ratio achieved is inferior to the S/N ratio that would be obtained if the sub-bands were combined coherently.

Figure 9:
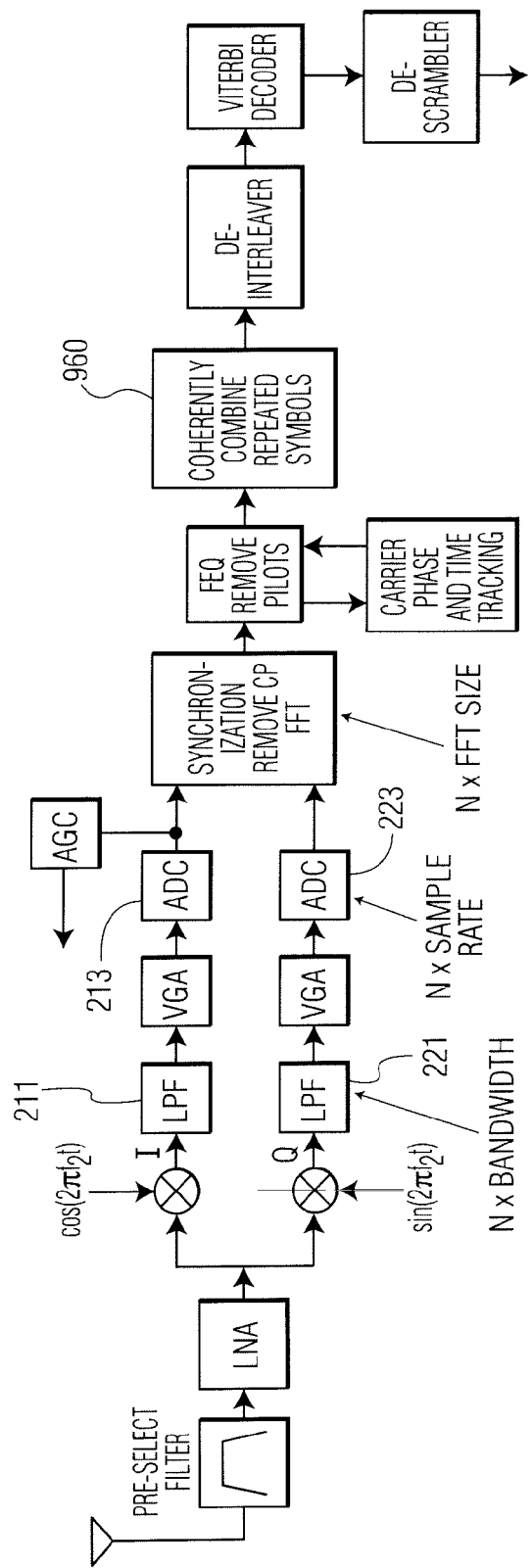
FIG. 9 is a block diagram of an exemplary receiver architecture according to a still further embodiment of the present invention.

Referring to FIG. 9, another option is to coherently combine repeated OFDM symbols following the FFT. This coherent combining is performed in block 960. In this approach, maximum ratio combining of sub-bands may be used, in which each sub-band is multiplied by the complex conjugate of an estimated tap weight corresponding to the sub-band prior to additive combining. The wideband receiver must be capable of a baseband sample rate of two or three times the sample rate for a single sub-band (e.g., two or three times 528 MHz). The corresponding FFT size is two or three times the size for single sub-band (e.g., 256 points or 384 points). In general, as indicated in FIG. 9:

1. The bandwidth of the low-pass filters 211, 221 is N times the bandwidth required for a single sub-band.
2. The sample rate of the A/D converters 213, 223 is N times the sample rate required for a single sub-band.
3. The size of the FFT is N times that required for a single sub-band.

When all three sub-bands are used, the arrangement of FIG. 9 effectively triples the spreading gain, i.e., coherent combining of several diverse versions of the signal, each of which is subject to uncorrelated noise, such that the SNR is improved by the same ratio (the spreading gain) as the number of copies of the signal combined. However, this improvement comes at the cost of substantial greater complexity, particular insofar as the size of the FFT is concerned.

Figure 10A:
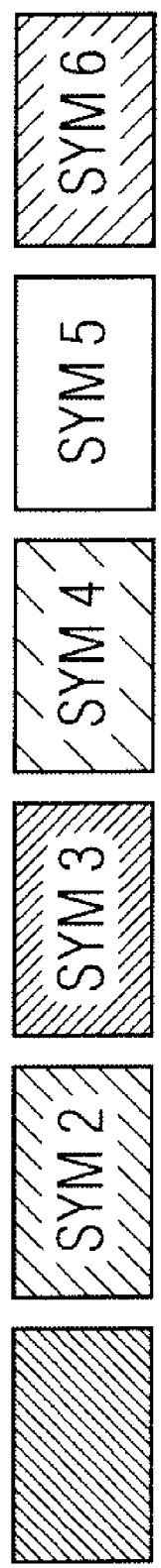
Figure 10B:
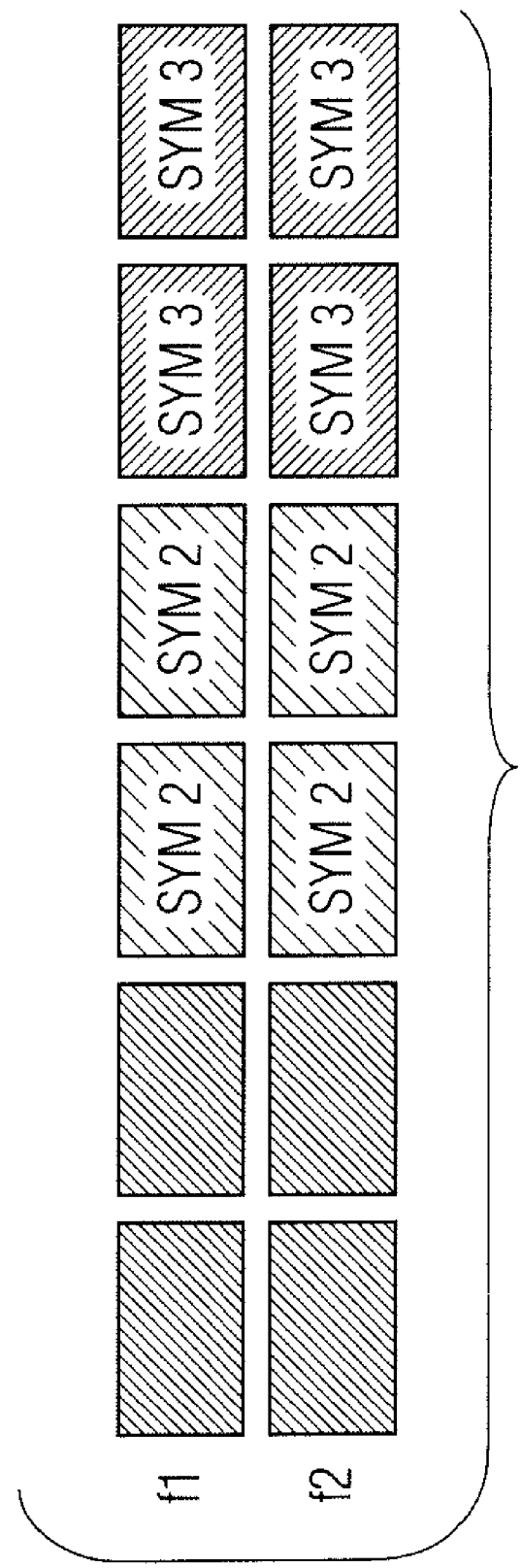

In order to reduce this complexity, a combination of time and frequency spreading may be used. Referring to FIG. 10a, FIG. 10b and FIG. 10c, time-frequency spreading is illustrated. FIG. 10a shows no spreading. A single sub-band is used at a time, and each OFDM symbol transmitted is different. In FIG. 10b, 2.times. spreading is used. The same OFDM symbols are transmitted within two different sub-bands at the same time. Within each sub-band, a particular OFDM symbol is transmitted twice consecutively. In FIG. 10c, 3.times. spreading is used. The same OFDM symbols are transmitted within three different sub-bands at the same time. Within each sub-band, a particular OFDM symbol is transmitted three times consecutively. Note that the number of times a particular OFDM symbol is transmitted consecutively is the same as the number of sub-bands used at a time. This type of spreading may therefore be referred to as square time-frequency spreading.

Referring to FIG. 11, examples of modified spreading schemes are shown consistent with the existing MB-OFDM proposal. For data rates from 53.3 Mb/s to 200 Mb/s, the existing MB-OFDM proposal provides for a time spreading factor (TFS) of 2. For these data rates, square time-frequency spreading may be achieved by introducing a corresponding frequency spreading factor of 2. For data rates of 53.3 Mb/s and 106.7 Mb/s, a frequency spreading factor of 3 is also made possible by increasing the TSF from 2 to 3, at the same time changing the coding rate from ⅓ to ½. The net effect of these changes is to maintain the same data rate.

Figure 12:
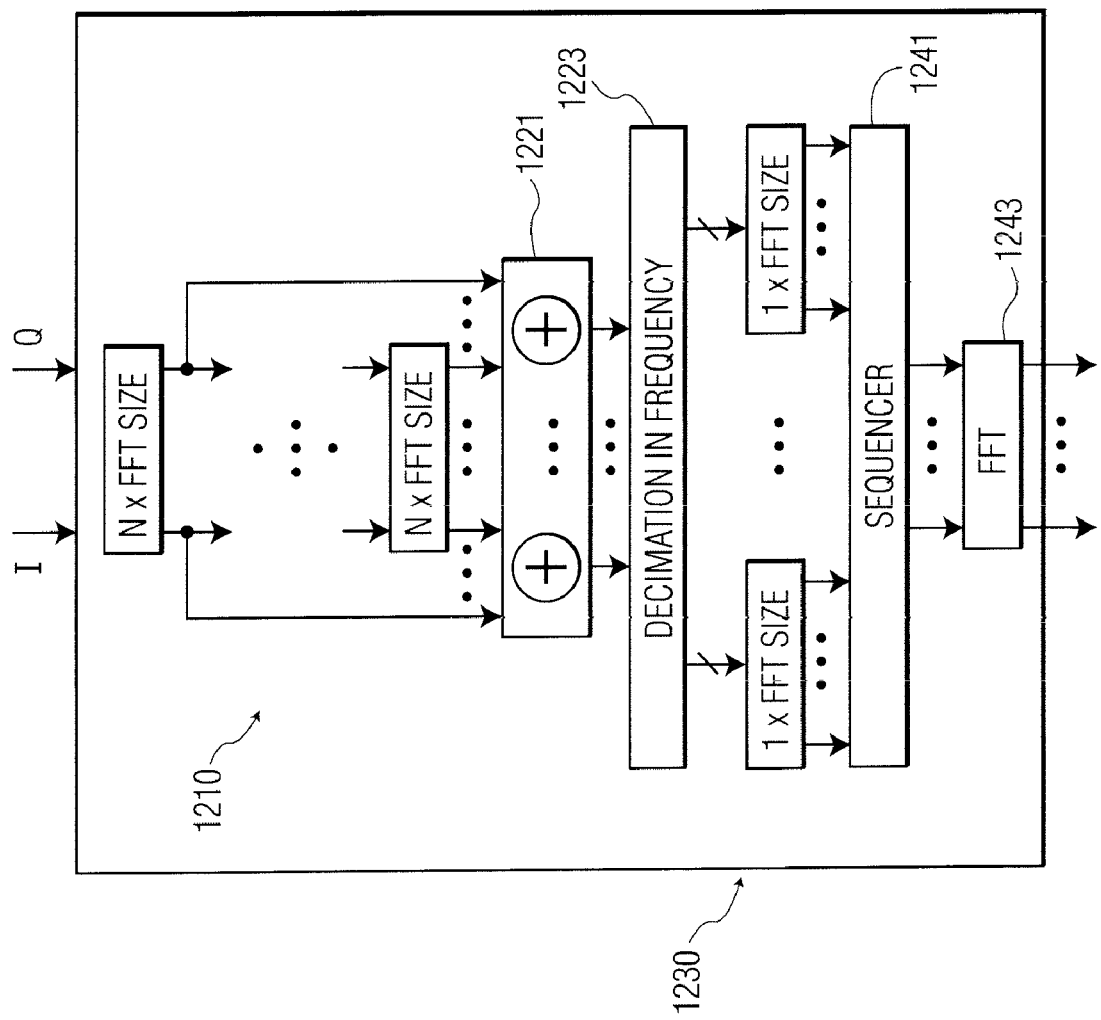
FIG. 12 is a block diagram of a modified receiver for receiving an OFDM signal using square time-frequency spreading.

Using square time-frequency spreading, it is possible to continuously occupy two or three sub-bands without increasing signal processing requirements. Referring to FIG. 12, a block diagram is shown of a portion of a receiver for receiving a signal using N×N time-frequency spreading. Complex I,Q samples are buffered in an N-stage buffer 1210. The N-stage buffer stores the equivalent of N consecutive identical OFDM symbols for all of the sub-bands. A full overlap-add operation is then performed (1221), combining the N consecutive OFDM symbols into a single OFDM symbol. Adding is sufficient, since numeric scaling of the signal does not alter the information content, especially since the modulation employed is QPSK and only sensitive to phase values. Thus far, as in the case of FIG. 9, the size of the required FFT is N times that required under the existing MB-OFDM proposal. At this point, in block 1223, decimation in frequency (a known signal processing technique) is used to form the data into N groups 1230, each group being of a size such that the required FFT is the same as required under the existing proposal. A sequencer 1241 is then used to allow the identical FFT hardware 1243 to perform the N (1×) FFTs in time-sequenced fashion. New inputs to the sequencer become available every N OFDM symbol periods. The sequencer outputs data for one 1×FFT every OFDM symbol period.

It will be appreciated by those of ordinary skill in the art that the present invention may be embodied in other specific forms without departing from the spirit or essential character thereof. The present description is therefore considered in all respects to be illustrative and not restrictive. The scope of the invention is indicated by the appended claims and not the foregoing description, and all changes which come within the meaning and scope of equivalents thereof are intended to be embraced therein.

What is claimed is:

1. A signaling method comprising:
   producing a sequence of N identical OFDM symbols;
   transforming the sequence of N identical OFDM symbols produce a baseband time-domain signal;
   processing the baseband time-domain signal to produce a radio frequency signal that occupies multiple sub-bands within a transmission band from about 3200 MHz to about 10300 MHz, each sub-band having a bandwidth of about 500 MHz;
   transmitting the radio frequency signal;
   wherein the sequence of N identical OFDM symbols is transmitted, via the radio frequency signal, in N different sub-bands at the same time, where N is greater than or equal to two.

2. The method of claim 1, wherein processing the baseband time-domain signal comprises:
   upsampling the baseband time-domain signal to produce an upsampled baseband time-domain signal;
   applying a pseudo-random code to the upsampled baseband time-domain signal to produce a coded baseband time-domain signal; and
   upconverting the coded baseband time-domain signal to produce a radio frequency signal.

3. The method of claim 1, wherein the radio frequency signal occupies multiple ones of the following sub-bands: a first sub-band from about 3200 MHz to about 3700 MHz; a second sub-band from about 4000 MHz to about 4200 MHz; and a third sub-band from about 4200 MHz to about 4800 MHz.

4. The method of claim 1, wherein processing the baseband time-domain signal comprises:
   upconverting the baseband time-domain signal to produce a radio frequency signal;
   wherein the radio frequency signal occupies multiple ones of the following sub-bands: a first sub-band from about 3200 MHz to about 3700 MHz; a second sub-band from about 4000 MHz to about 4200 MHz; and a third sub-band from about 4200 MHz to about 4800 MHz.

5. A radio communication system comprising:
   means for processing a communications signal that occupies multiple sub-bands within a transmission bandwidth of about 1500 MHz, each sub-band having a bandwidth of about 500 MHz;
   means for processing an OFDM symbol, including at least one of:
      inverse transform means for transforming an OFDM symbol to produce a baseband time-domain signal, said means for processing a signal processing the baseband time-domain signal to produce a radio frequency signal; and
      forward transform means for transforming a baseband time-domain signal to produce an OFDM symbol; and
   means for repeating OFDM symbols such that, at least during one mode of operation, each OFDM symbol occurs as part of a sequence of N identical OFDM symbols, wherein N is equal to the number of multiple sub-bands and where N is greater than or equal to two;

means for transmitting the radio frequency signal, wherein the sequence of N identical OFDM symbols is transmitted, via the radio frequency signal, in N different sub-bands at the same time.

6. The apparatus of claim 5, wherein the radio frequency signal occupies multiple ones of the following sub-bands: a first sub-band from about 3200 MHz to about 3700 MHz; a second sub-band from about 4000 MHz to about 4200 MHz; and a third sub-band from about 4200 MHz to about 4800 MHz.

7. The apparatus of claim 5, comprising:

forward transform means for transforming the baseband time-domain signal to produce an OFDM symbol; and means for selecting a subset of the multiple sub-bands and for receiving the radio frequency signal within the subset of sub-bands to produce the baseband time-domain signal.

8. The apparatus of claim 5, comprising:

forward transform means for transforming the baseband time-domain signal to produce an OFDM symbol; and means for receiving the radio frequency signal within multiple sub-bands and non-coherently combining signals from the multiple sub-bands to produce the baseband time-domain signal.

9. The apparatus of claim 5, comprising:

forward transform means for transforming the baseband time-domain signal to produce an OFDM symbol; and means for sampling the radio frequency signal within multiple sub-bands to produce the baseband time-domain signal, at a comparatively high sampling rate compared to a sampling rate for sampling the radio frequency signal within a single sub-band;

wherein the baseband time-domain signal transformed by the forward transform means is a column vector of complex values, the column vector being of a comparatively large size compared to a size for representing a single sub-band.

10. The apparatus of claim 9, comprising:

means for decomposing the column vector into multiple smaller column vectors and for applying the multiple smaller column vectors sequentially in time to the forward transform means.

11. The apparatus of claim 10, wherein the number of smaller column vectors is equal to the number of multiple sub-bands.

12. A signaling method comprising:

producing a sequence of N identical OFDM symbols;

transforming the sequence of N identical OFDM symbols to produce a baseband time-domain signal;

processing the baseband time-domain signal to produce a radio frequency signal that occupies multiple sub-bands within a transmission band from about 3200 MHz to about 10300 MHz, each sub-band having a bandwidth of about 500 MHz;

transmitting the radio frequency signal;

wherein the sequence of N identical OFDM symbols is transmitted, via the radio frequency signal in N different sub-bands at the same time, where N is greater than or equal to two;

wherein processing the baseband time-domain signal including:

upsampling the baseband time-domain signal to produce an upsampled baseband time-domain signal;

applying a pseudo-random code to the upsampled baseband time-domain signal to produce a coded baseband time-domain signal; and upconverting the coded baseband time-domain signal using a single frequency LO to produce a radio frequency signal.

* * * * *

UNITED STATES PATENT AND TRADEMARK OFFICE
CERTIFICATE OF CORRECTION

PATENT NO.         : 7,809,067 B2
APPLICATION NO.    : 10/853436
DATED              : October 5, 2010
INVENTOR(S)        : Charles Razzell Page 1 of 1

It is certified that error appears in the above-identified patent and that said Letters Patent is hereby corrected as shown below:

In column 8, lines 15-16 (claim 1), please delete "OFDM symbols produce" and insert --OFDM symbols to produce--.

In column 9, line 8 (claim 6), please delete "The apparatus of claim 5," and insert --The system of claim 5,--.

In column 9, line 14 (claim 7), please delete "The apparatus of claim 5," and insert --The system of claim 5,--.

In column 9, line 21 (claim 8), please delete "The apparatus of claim 5," and insert --The system of claim 5,--.

In column 9, line 28 (claim 9), please delete "The apparatus of claim 5," and insert --The system of claim 5,--.

In column 10, line 4 (claim 10), please delete "The apparatus of claim 9," and insert --The system of claim 9,--.

In column 10, line 9 (claim 11), please delete "The apparatus of claim 10," and insert --The system of claim 10,--.

Signed and Sealed this
Sixth Day of November, 2012

David J. Kappos
*Director of the United States Patent and Trademark Office*